United States Patent
Aoki et al.

(10) Patent No.: US 7,228,519 B2
(45) Date of Patent: Jun. 5, 2007

(54) PROGRAM FOR CAUSING A COMPUTER TO EXECUTE A METHOD OF GENERATING MESH DATA AND APPARATUS FOR GENERATING MESH DATA

(75) Inventors: Kenichiro Aoki, Kawasaki (JP); Koichi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 10/641,007

(22) Filed: Aug. 15, 2003

(65) Prior Publication Data

US 2004/0210425 A1    Oct. 21, 2004

(30) Foreign Application Priority Data

Aug. 30, 2002    (JP) .............................. 2002-255923

(51) Int. Cl.
G06F 17/50    (2006.01)
G06F 17/693    (2006.01)

(52) U.S. Cl. ........................................ 716/15; 716/4
(58) Field of Classification Search ................ 716/20, 716/4, 15
See application file for complete search history.

(56) References Cited

U.S. PATENT DOCUMENTS

| 5,617,322 | A  | * | 4/1997  | Yokota ........................ 700/98 |
| 5,946,479 | A  | * | 8/1999  | Sakaguchi et al. ............ 716/20 |
| 6,178,544 | B1 | * | 1/2001  | Syo ............................. 716/20 |
| 6,259,453 | B1 | * | 7/2001  | Itoh et al. .................... 345/423 |
| 6,360,190 | B1 | * | 3/2002  | Kumashiro .................... 703/2 |
| 6,453,275 | B1 | * | 9/2002  | Schoenmaker et al. ........ 703/2 |
| 6,526,550 | B1 | * | 2/2003  | Badding et al. ............... 716/5 |
| 6,947,879 | B2 | * | 9/2005  | Yamada et al. ................ 703/2 |
| 2001/0039487 | A1 | * | 11/2001 | Hammersley et al. ......... 703/2 |
| 2002/0140435 | A1 | * | 10/2002 | Nishino et al. ............. 324/627 |
| 2003/0020710 | A1 | * | 1/2003  | Biermann et al. .......... 345/420 |
| 2004/0001060 | A1 | * | 1/2004  | Stollnitz et al. ............ 345/423 |

FOREIGN PATENT DOCUMENTS

| JP | 9-185729  | 7/1997 |
| JP | 11-025292 | 1/1999 |
| JP | 11-025293 | 1/1999 |

* cited by examiner

*Primary Examiner*—Paul Dinh
*Assistant Examiner*—Suresh Memula
(74) *Attorney, Agent, or Firm*—Staas & Halsey LLP

(57) ABSTRACT

A method of generating mesh data by orthogonally dividing a target object into a mesh of elements by a plurality of grid lines orthogonally crossing each other includes the steps of (a) detecting vertexes of the target object; and (b) dividing the target object orthogonally by the grid lines passing through the detected vertexes.

44 Claims, 9 Drawing Sheets

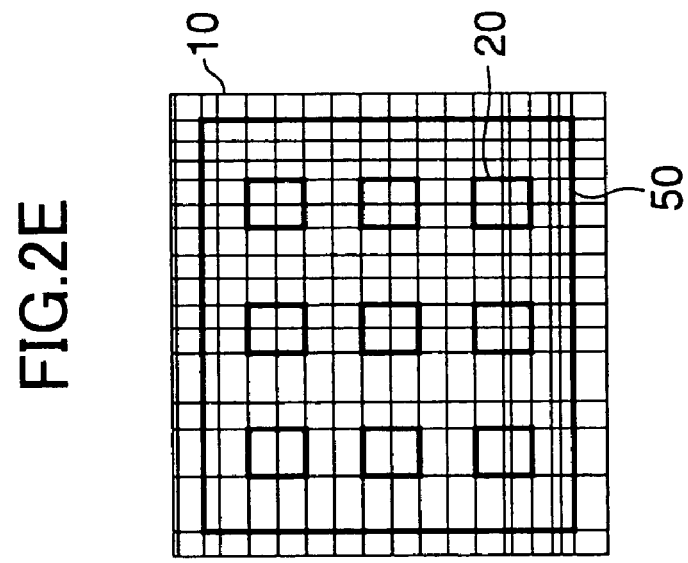
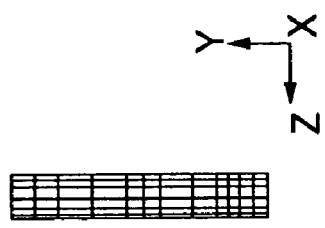
FIG.2B
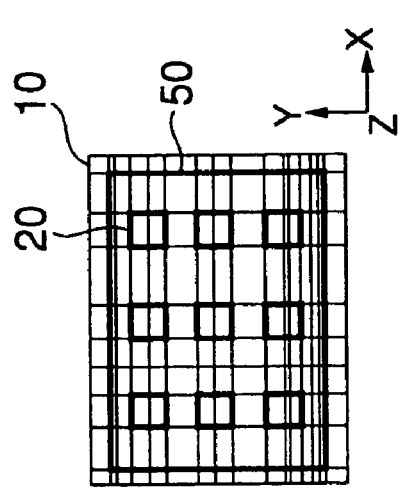
FIG.2A
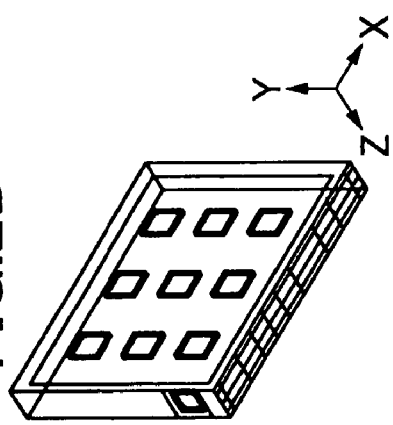
FIG.2D
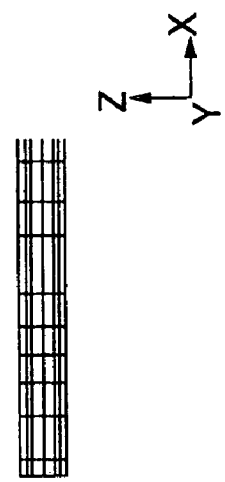
FIG.2C

ORIGINAL CAD DATA — MESH

CUBE DATA

PROGRAM FOR CAUSING A COMPUTER TO EXECUTE A METHOD OF GENERATING MESH DATA AND APPARATUS FOR GENERATING MESH DATA

BACKGROUND OF THE INVENTION

1. Field of the Invention

The present invention generally relates to programs for causing a computer to execute a method of generating mesh data and apparatuses for generating mesh data, and more particularly to a program for causing a computer to execute a mesh data generating method capable of relatively simply generating highly accurate mesh data and a mesh data generating apparatus suitable for such a method.

2. Description of the Related Art

Herein, mesh data refers to data that is obtained by dividing a predetermined structure into a mesh of elements, obtaining a characteristic value representing the characteristics of each mesh element, and approximating the structure by the set of the mesh elements in the case of performing analyses using a computer, such as a structural analysis, a heat transfer analysis, a fluid analysis, a thermal fluid analysis, and an electromagnetic field analysis, so that such analyses are effectively performed.

In recent years, as electronic devices have been reduced in size and weight as peripheral devices for computers, it has been required to design the structure of the electronic devices, especially, printers, so that the behavior of heat generated therefrom is suitably controlled. For this purpose, it is necessary to analyze the behavior of heat in the complicated internal structures of the electronic devices with good accuracy. Thermal fluid analysis is a technology for achieving such accurate analysis, and mesh data is employed as data to be provided to a tool for performing the analysis by a computer, that is, software.

Japanese Laid-Open Patent Application No. 11-025293 discloses a method for generating the mesh data. This method, taking advantage of the merits of the orthogonal difference method and the finite element method, has an object of enabling an analysis model having a complicated shape, where an object of analysis is formed of a plurality of substances or regions, to be divided easily into a mesh of elements with good accuracy.

Japanese Laid-Open Patent Application No. 11-025292 discloses an automatic mesh dividing method which, in an analysis using the finite element method, is capable of generating mesh data of a mesh size satisfying required analysis accuracy and of using an equivalent mesh, an inequivalent mesh, or a junction mesh as required.

Further, Japanese Laid-Open Patent Application No. 9-185729 discloses an orthogonal difference mesh data creating method having an object of easily creating orthogonal difference mesh three-dimensional model data required for analysis by a CAE (computer aided engineering) system from three-dimensional stereoscopic model data created by a CAD (computer aided design) system.

SUMMARY OF THE INVENTION

However, these methods, which are intended basically for a complicated curved-surface structure, have relatively complicated operation algorithms. As a result, these methods are considered to require a considerable amount of processing and time in operation for an electronic device having a relatively simple structure so as to be regarded as a set of rectangular shapes.

Accordingly, it is a general object of the present invention to provide a method of dividing an object of analysis into a mesh of elements in which the above-described disadvantage is eliminated.

A more specific object of the present invention is to provide a method of effectively dividing an object of analysis into a mesh of elements with good accuracy with a relatively simple structure.

The above objects of the present invention are achieved by a method of generating mesh data by orthogonally dividing a target object into a mesh of elements by a plurality of grid lines orthogonally crossing each other, the method including the steps of (a) detecting vertexes of the target object, and (b) dividing the target object orthogonally by the grid lines passing through the detected vertexes.

The above objects of the present invention are also achieved by a program for causing a computer to execute a method of generating mesh data by orthogonally dividing a target object into a mesh of elements by a plurality of grid lines orthogonally crossing each other, the method including the steps of (a) detecting vertexes of the target object, and (b) dividing the target object orthogonally by the grid lines passing through the detected vertexes.

The above objects of the present invention are also achieved by a computer-readable recording medium storing a program for causing a computer to execute a method of generating mesh data by orthogonally dividing a target object into a mesh of elements by a plurality of grid lines orthogonally crossing each other, the method including the steps of (a) detecting vertexes of the target object, and (b) dividing the target object orthogonally by the grid lines passing through the detected vertexes.

The above objects of the present invention are further achieved by an apparatus for generating mesh data by orthogonally dividing a target object into a mesh of elements by a plurality of grid lines orthogonally crossing each other, the apparatus including a detection part detecting vertexes of the target object, and a division part dividing the target object orthogonally by the grid lines passing through the detected vertexes.

According to the present invention, mesh data to be input to the thermal fluid analysis tool of an electronic device can be generated with relative ease. Further, with a relatively simple configuration, the original CAD data of the electronic device can be converted to orthogonally divided mesh data formed of a minimum required number of mesh elements while maintaining the original structural information as much as possible. As a result, in the case of causing a computer to execute the method of the present invention, the amount of processing and time required in analysis operations can be effectively reduced, so that the thermal fluid analysis of the electronic device can be performed far more efficiently.

BRIEF DESCRIPTION OF THE DRAWINGS

Other objects, features and advantages of the present invention will become more apparent from the following detailed description when read in conjunction with the accompanying drawings, in which:

FIGS. 2A through 2E are diagrams for illustrating the operation of the thermal fluid analysis tool to which the present invention is applicable according to the embodiment of the present invention;

DETAILED DESCRIPTION OF THE PREFERRED EMBODIMENTS

A description will now be given, with reference to the accompanying drawings, of an embodiment of the present invention.

First, a description will be given, with reference to FIGS. 1 through 3, of an operation of a software program as a thermal fluid analysis tool to which the present invention is applicable.

Figure 1:
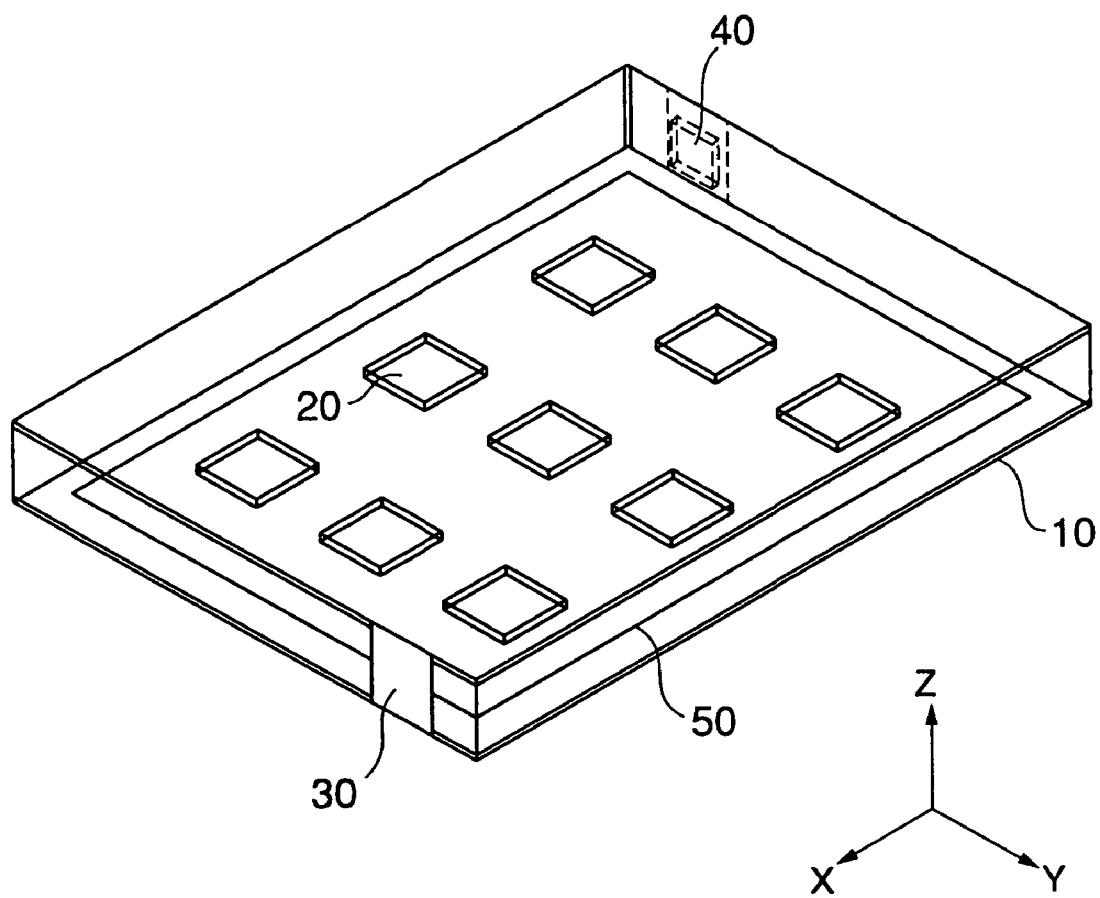
FIG. 1 is a diagram for illustrating an operation of a thermal fluid analysis tool to which the present invention is applicable according to an embodiment of the present invention.

FIG. 1 is a perspective view of an electronic device that is an object of analysis to be subjected to thermal fluid analysis by the analysis tool. As shown in FIG. 1, the electronic device includes multiple printed circuit boards (PCB) 20 as heat generating sources provided on a PCB table 50 in a housing 10. The housing 10 includes an intake fan 40 and an outlet 30 for discharging heat generated from the PCBs 20.

An operator inputs the structure information of an object of analysis (an object to be analyzed) as shown in FIG. 1 to the analysis tool by performing a predetermined input operation on a computer terminal installed with software forming the analysis tool. In this case, the analysis tool has special applications dedicated to the respective components of the object of analysis including its housing, so that input items including the basic characteristics of each component, such as size data, are prepared. That is, data on the housing 10 and data on openings such as an inlet to which the intake fan 40 is provided and the outlet 30 are input by using an application for housing input and an application for opening input, respectively. Data on the intake fan 40 is input by selecting the corresponding item from a prepared library. Likewise, a special tool is prepared for inputting data on the PCBs 20.

After thus inputting the structural data of the object of analysis, for thermal fluid analysis, environmental temperature and pressure data are input and a convective heat transfer coefficient determining the amount of heat dissipation from the surface of the housing 10 is set.

The operation of inputting the data on the housing 10 will be expatiated below. Specifically, the size, plate thickness, and material of the housing 10 are input. Further, the surfaces on which the inlet and the outlet 30 are formed are selected, and the coordinate positions of the inlet and the outlet 30 are input. When the material data is input, the analysis tool automatically sets the corresponding heat conductivity and plate surface heat emissivity. Further, the intake fan 40 is selected from the library so that the analysis tool automatically sets the corresponding predetermined fan characteristics. Further, with respect to the intake fan 40, data on the depth of its position in the direction of the thickness of the housing 10 is also set. Furthermore, air-flow resistance should be set for the outlet 30. Specifically, the analysis tool automatically calculates and sets the air-flow resistance by setting the opening of the outlet 30. At this point, the operation efficiency can be increased by selecting the opening from the prepared library.

With respect to each of the PCBs 20, the size, the materials of its insulators and conductors, the thickness of each of its wiring layers, and the wiring rate are set. Further, the amount of heat generated from, the number of, and the radiation characteristics of electronic components mounted on each of the PCBs 20 are set. At this point, however, it is not necessary to know the behavior of the temperature of each individual component on each PCB 20. It is considered that the entire surface of each PCB 20 evenly generates heat, and the heat-generating position and the amount of heat generated of each electronic component included in each PCB 20 are ignored.

Further, gridding is performed. Gridding is an operation of dividing the internal and external predetermined spaces of the object of analysis into a mesh of elements (mesh elements) based on the disposition and the data on the outside dimension of each component input as shown in FIG. 1. A grid is automatically formed on the ridge lines of all of the components attached and set as shown in FIG. 1. Generally, analysis cannot be performed with sufficient accuracy with this grid only, so that an additional grid is formed. FIGS. 2A through 2C are diagrams showing the state before the grid-adding operation. FIG. 2D is a perspective view corresponding to FIG. 1. FIG. 2E is a diagram showing the state where the additional grid is formed. By thus forming the additional grid, the entire object of analysis is covered evenly with the grids. Thereafter, actual calculation methods for thermal fluid analysis (pressure and temperature equations) are selected, and other detailed calculation conditions are set.

Figure 3A:
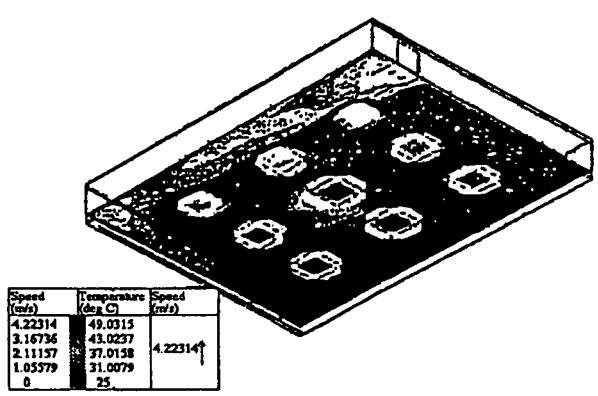
FIGS. 3A through 3D are diagrams for illustrating the operation of the thermal fluid analysis tool to which the present invention is applicable according to the embodiment of the present invention.
Figure 3B:
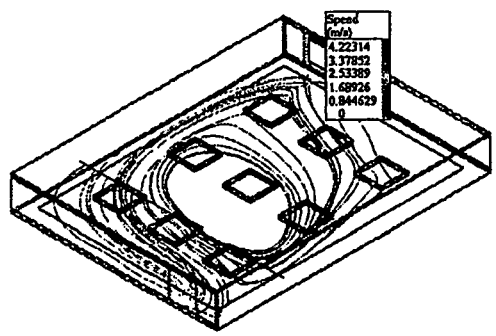
Figure 3C:
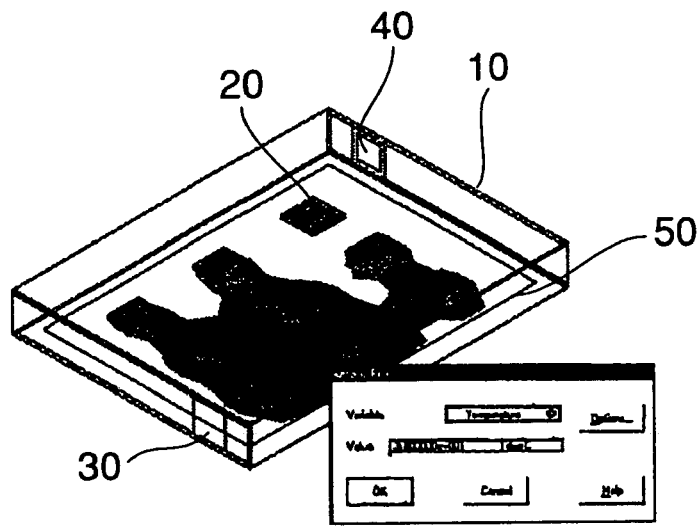
Figure 3D:
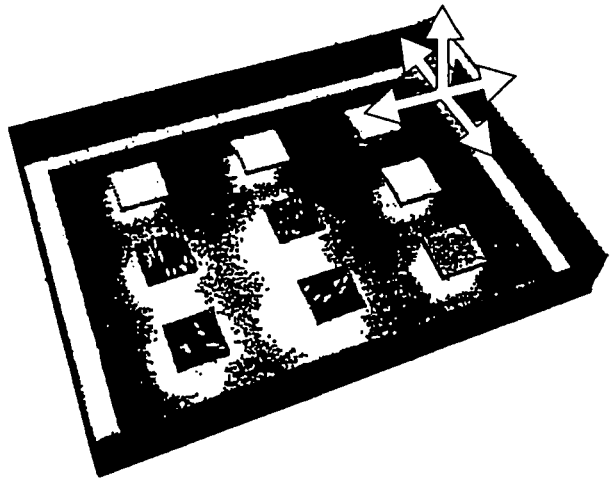

FIGS. 3A through 3D are diagrams showing the results of a thermal fluid analysis simulation performed on the electronic device by a computer using the analysis tool based on the setting after the above-described setting operation. FIG. 3A shows a temperature distribution on the PCB table 50 in the electronic device as the object of analysis. FIG. 3B shows a thermal fluid flow pattern in the electronic device. FIG. 3C shows an equal temperature surface in the electronic device. FIG. 3D shows the surface temperature of each component in the electronic device.

Based on the thus obtained simulation results of the temperature distribution of the components, the disposition of the PCBs 20, the capacity of the intake fan 40, the size of the inlet and the outlet 30, the size and the material of each component, and the heat resistance capacity of each mounted component of each PCB 20 are re-examined. By repeating these operations, an optimum structure for the electronic device can be designed with efficiency in consideration of the behavior of thermal fluid inside the electronic device.

Figure 4A:
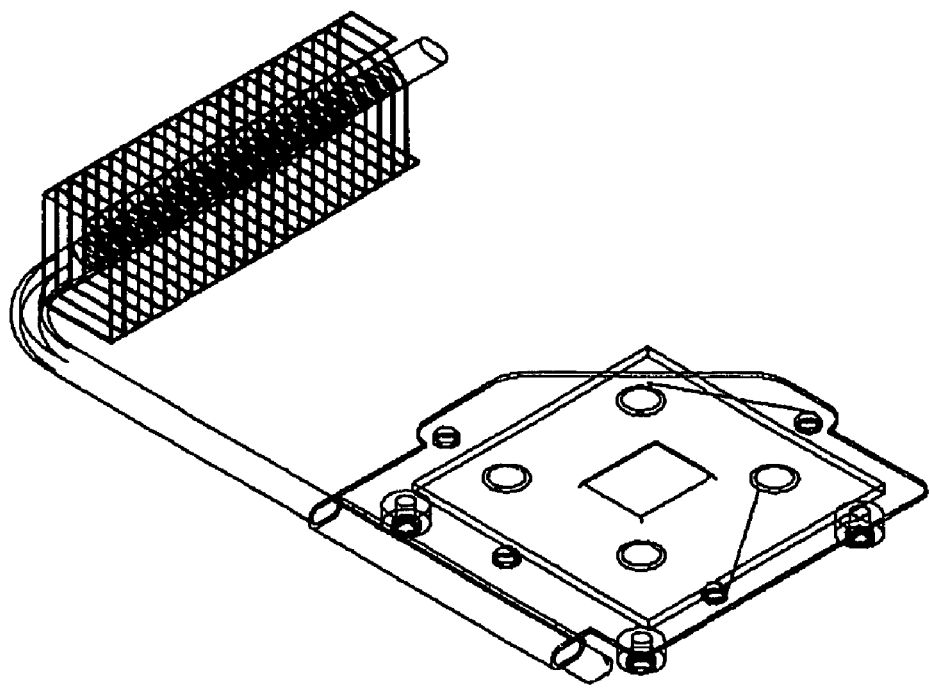
FIGS. 4A and 4B are diagrams showing a case of converting polygon data such as CAD data to cube data for thermal fluid analysis according to the embodiment of the present invention.
Figure 4B:
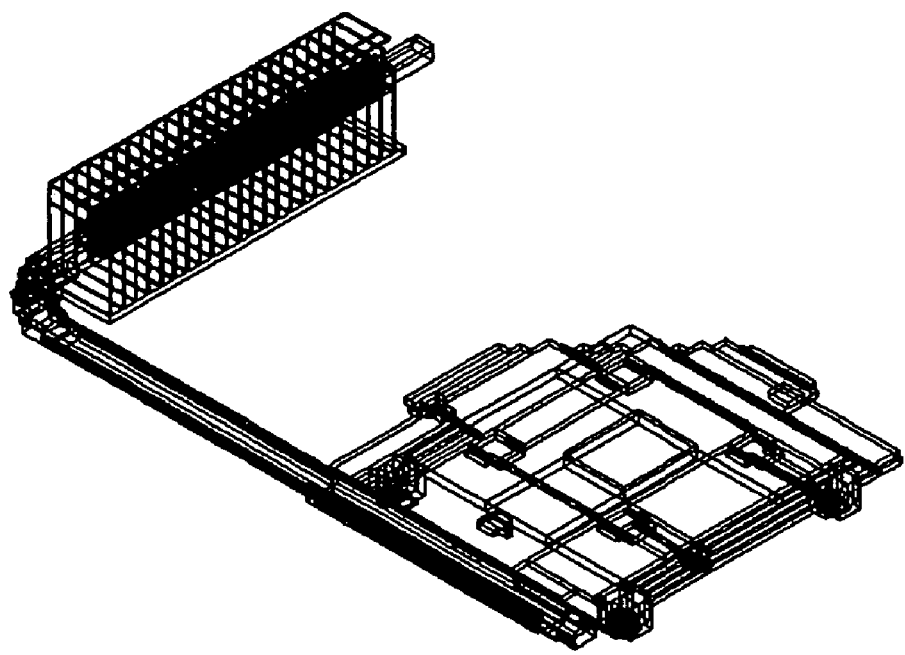

In inputting the position and the size data of each component as shown in FIG. 1, it is not necessarily required that the operator input the size and the coordinate position of each component one by one as previously described. Alternatively, it is possible to use the CAD data (IGES or STEP) obtained at the time of designing the electronic device by temporarily converting the CAD data into polygon data such as STL data. Specifically, as shown in FIGS. 4A and 4B, the polygon data of FIG. 4A is converted into the cube data (corresponding to an orthogonal mesh) for thermal fluid analysis of FIG. 4B, so that the structural input data suitable for the thermal fluid analysis tool as shown in FIG. 1 can be obtained. By setting the characteristic values (material and amount of heat generated) of each component for the structural data, the above-described set inputs for thermal fluid analysis can be obtained.

Thus, the CAD data is temporarily converted into the polygon data in order to obtain data to be supplied to the thermal fluid analysis tool. The polygon data has a data structure formed of vertex information. Therefore, a vertex search can be performed at high speed at the time of performing analysis by the thermal fluid analysis tool. Further, the polygon data has a simple data structure so that the processing algorithm of the thermal fluid analysis tool is simplified. As a result, by obtaining the cube data from the polygon data, processing can be performed efficiently on a complicated model shape.

The present invention is applicable not only to this thermal fluid analysis tool, but also to other analysis tools such as a structural analysis tool and an electromagnetic field analysis tool. In the case of the structural analysis tool, the present invention is applicable in generating well-known FEM data (including nodes and element data). In the case of the electromagnetic field analysis tool, the present invention is applicable in generating well-known surface data.

Next, a description will be given of a conventional method of generating mesh data for these various analysis tools, for instance, cube data conforming to an orthogonal mesh for a thermal fluid analysis tool.

Figure 5A:
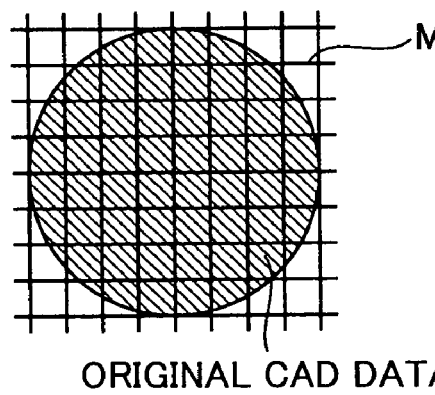
FIGS. 5A and 5B are diagrams for illustrating a common method of generating mesh data.
Figure 5B:
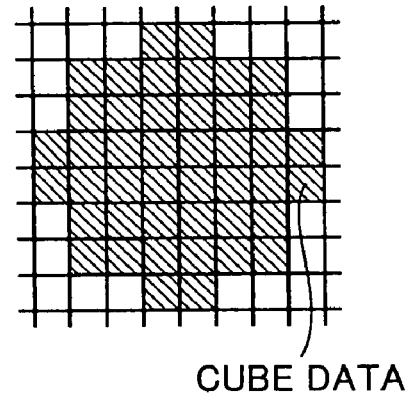

FIGS. 5A and 5B show a method of converting spherical data as original CAD data into cube data. In this case, as shown in FIG. 5A, a mesh is formed on a target object (an object of analysis) represented by the original CAD data. Then, the cubes as mesh elements are divided into those forming the elements of the target object and those not forming the elements of the target object based on a criterion such as whether the ratio of the volume that the original CAD data of the target object occupies in the cube forming a mesh element is larger than or equal to a constant value. As a result, the cube data conforming to an orthogonal mesh as shown in FIG. 5B can be obtained.

Figure 6A:
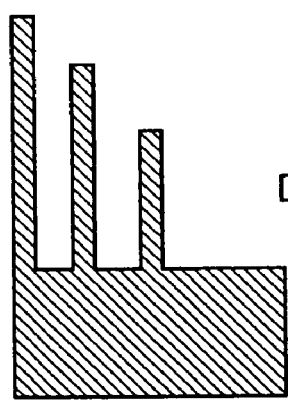
FIGS. 6A through 6C are diagrams for illustrating the common method of generating mesh data.
Figure 6B:
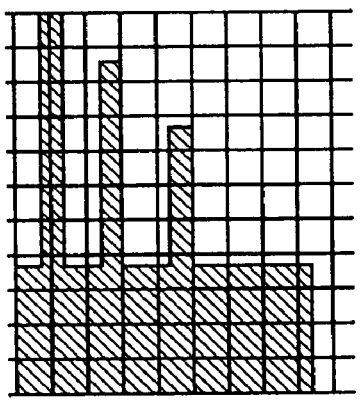
Figure 6C:
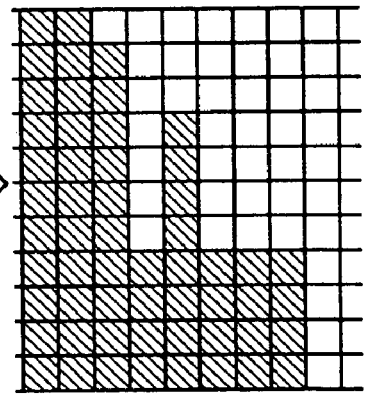

Next, a description will be given, with reference to FIGS. 6A through 6C, of the problem of such a method of forming cube data. For instance, the target object includes parts (such as fins for heat dissipation) each having a width narrower than the interval between lines of a mesh to be formed on the target object as shown in FIG. 6A. Then, the orthogonal mesh of equally spaced lines is formed over the target object as shown in FIG. 6B, so that cube data as shown in FIG. 6C is formed. In this case, as shown in FIG. 6C, the cubes corresponding to the narrow parts of the target object are filled in. In the case of performing thermal fluid analysis using this cube data, the heat dissipation effect that should be obtained by the fins for heat dissipation is ignored, so that no accurate results can be expected of the analysis. This problem may be solved by narrowing the intervals between the equally spaced lines of the orthogonal mesh to some extent. In this case, however, the amount of processing and time required in analysis calculations increases so that the analysis may not be performed with efficiency.

Figure 7A:
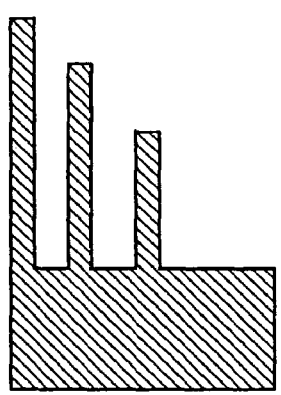
FIGS. 7A through 7C are diagrams for illustrating a method of generating mesh data according to the embodiment of the present invention.
Figure 7B:
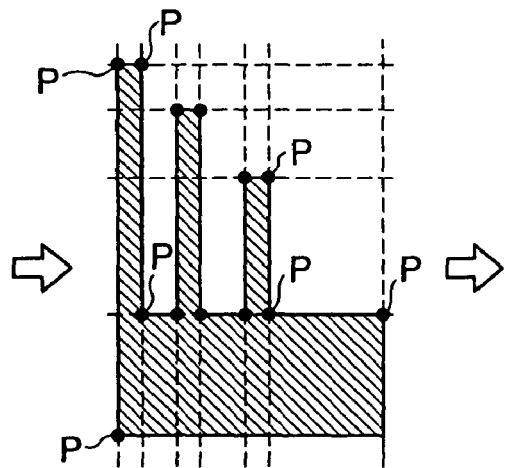
Figure 7C:
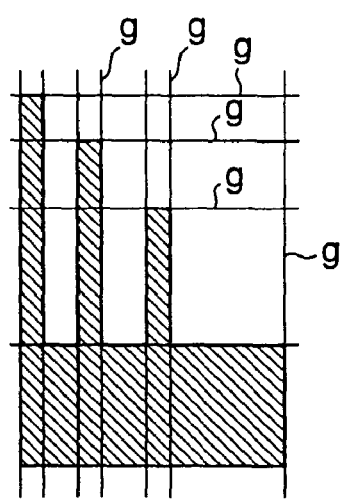

FIGS. 7A through 7C are diagrams for illustrating a method of generating mesh data (cube data) according to the embodiment of the present invention. According to this method, the vertexes P of the target object are detected as shown in FIG. 7B from the original CAD data that is input data as shown in FIG. 7A. Then, an orthogonal grid, that is, a mesh, passing through the vertexes P is formed as shown in FIG. 7C. By this method, the narrow parts can be captured as they are as cube data or mesh data.

Next, an expatiation will be given, with reference to FIGS. 8 and 9A through 9C, of the method of generating mesh data according to the embodiment.

Figure 8:
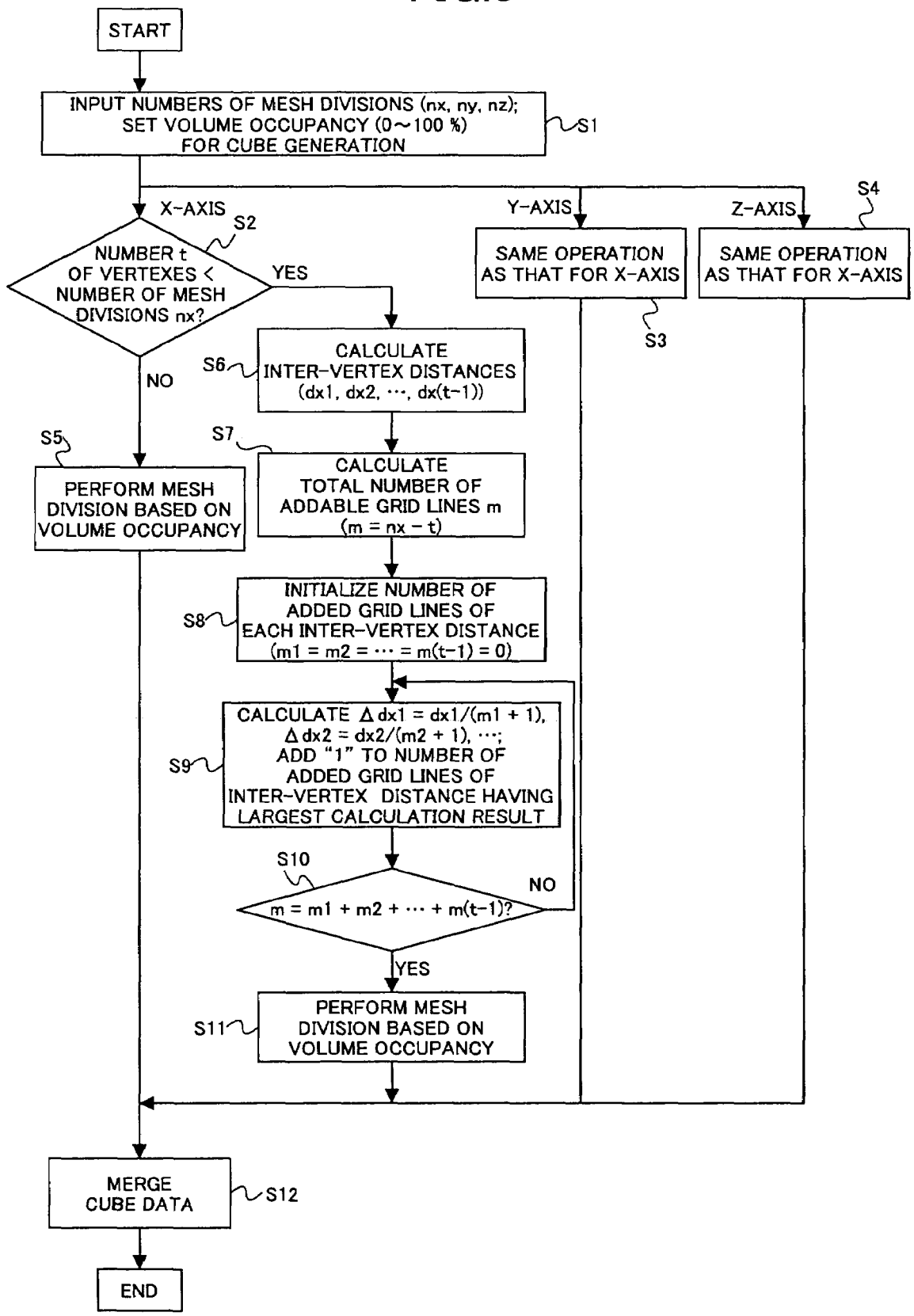
FIG. 8 is a flowchart for illustrating the method of generating mesh data according to the embodiment of the present invention.
Figure 9:
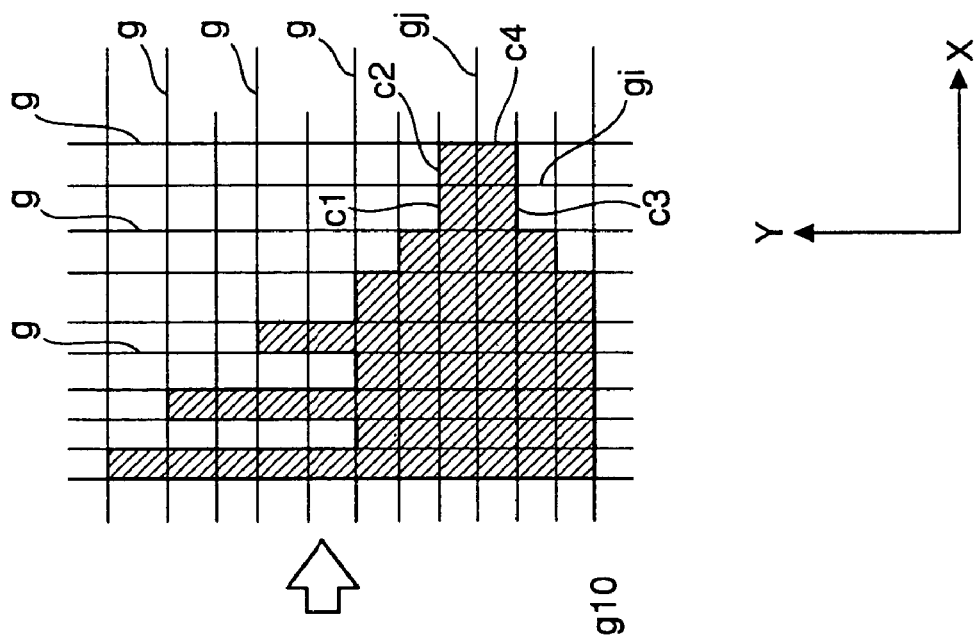
FIGS. 9A through 9C are diagrams for illustrating the method of generating mesh data according to the embodiment of the present invention.

First, in step S1 of FIG. 8, the numbers of mesh divisions $nx$, $ny$, and $nz$ of the X-axis, Y-axis, and Z-axis, respectively, which numbers correspond to an allowable amount of analysis operation are set and input. Further, the volume occupancy (zero through 100%) for determining whether a cube forms an element of the object of analysis is set and input. In the case of FIGS. 9A through 9C, the number of mesh divisions $nx$ along the X-axis is set to ten, and the number of mesh divisions $ny$ along the Y-axis is set to 12. In the case of FIGS. 9A through 9C, the mesh data is considered to be two-dimensional for convenience of description, so that a description will be focused only on the X and Y directions.

Next, a mesh dividing operation is performed on each of the X-axis, Y-axis, and Z-axis. Here, a description will be given only of the operation in the X directions (step S2 and steps S5 through S11), and a description of the operations in the other directions, that is, the operations in the Y directions (step S3) and the Z directions (step S4), which are equal to the operation in the X directions, will be omitted.

In step S2, the number $t$ of vertexes P of the target object detected from the original CAD data is compared with the number of mesh divisions $nx$ set in step S1. In the case of FIGS. 9A through 9C, the number $t$ of vertexes P in the X directions is seven, so that $nx=ten>seven$. Therefore, the operation proceeds to step S6. If the number $t$ of detected vertexes P is equal to or larger than the set number of mesh divisions $nx$ (that is, "NO" in step S2), the operation proceeds to step S5, where all of grid lines g passing through the detected vertexes P are formed so that the target object is divided into a mesh of elements (cubes) as shown in FIGS. 7A through 7C. Then, it is determined based on the volume occupancy set in step S1 whether each of the element cubes formed by the three-dimensional mesh determined by the results of the mesh dividing operation in the X directions along with the results of the mesh dividing operations in the Y and Z directions forms an element of the object of analysis. Thereby, the cube data as shown in FIG. 7C is obtained.

On the other hand, in the case of step S6, the distances between the vertexes P, for instance, the inter-vertex distances $dx1$, $dx2$, . . . , $dx6$ in the case of FIG. 9B, are measured. Next, in step S7, the difference $m$ between the set number of mesh divisions $nx$ and the number $t$ of detected vertexes P is obtained. This value $m$ is the number of addable grid lines. In the case of FIGS. 9A through 9C, the number $t$ of detected vertexes P is seven as previously described, so that $10 (nx)-7=3$, that is, the number of addable grid lines is three. Next, in step S8, the numbers of added grid lines $m1$, m2, ..., m6 of the inter-vertex distance dx1, dx2, ..., dx6, respectively, are initialized to zero.

Further, in step S9, each of the inter-vertex distances dx1, dx2, ..., dx6 is divided by the value obtained by temporarily adding "1" to the corresponding number of added grid lines (m1, m2, ..., or m6). That is, the intervals between the grid lines in the case of equally dividing each of the inter-vertex distances dx1, dx2, ..., dx6 with additional grid lines are obtained. Then, actually, "1" is added to the number of added grid lines of one of the inter-vertex distances dx1, dx2, ..., dx6 which one has the largest inter-gridline interval. Then, in step S10, the total number of added grid lines after adding the grid line in step S9 is obtained, and it is determined whether the total number of added grid lines is equal to the number of addable grid lines m obtained in step S7. As a result of step S10, if the total number of added grid lines still falls short of the number of addable grid lines m, the operation returns to step S9. In step S9, with the grid line actually added in step S9 of the previous time being provided, each of the inter-vertex distances dx1, dx2, ..., dx6 is again equally divided by the value obtained by temporarily adding "1" to the corresponding number of added grid lines (m1, m2, ..., or m6), so that the inter-gridline intervals of the inter-vertex distances dx1, dx2, ..., dx6 are obtained. Then, actually, "1" is added to the number of added grid lines of one of the inter-vertex distances dx1, dx2, ... dx6 which one has the largest inter-gridline interval. Then, in step S10, it is determined whether the total number of added grid lines reaches the number of addable grid lines m obtained in step S7. Thereafter, the loop of steps S9 and S10 is repeated until the determination result of step S10 becomes "YES."

In the case of FIG. 9B, when the number of grid lines added to the inter-vertex distance dx6 becomes three, that is, when the three grid lines g8, g9, and g10 are actually added thereto, the total number of added grid lines becomes three so as to match the number of addable grid lines m. As a result, the total number of mesh divisions, that is, the total number of grid lines, is equal to the set value "10" (the grid lines g1 through g10).

Then, in step S11, the grid lines g thus determined are actually formed on the target object so that the target object is divided into a mesh of elements. Then, it is determined based on the volume occupancy set in step S1 whether each of the element cubes formed by the three-dimensional mesh determined by the results of the mesh dividing operation in the X directions along with the results of the mesh dividing operations in the Y and Z directions forms an element of the object of analysis. Thereby, the cube data, that is, the mesh data, as shown in FIG. 9C is obtained.

Then, in step S12, a merge operation is performed as required. That is, in the case of FIG. 9C, the four cube data elements c1, c2, c3, and c4 can be integrated into a single cube data set. In this case, the corresponding grid lines gi and gj are deleted. By thus suitably performing the merge operation, the amount of cube data handled in analysis processing can be effectively reduced, so that the amount of processing and time required in analysis operations can be effectively reduced. However, it should be determined based on conditions at the time of analysis whether to actually perform the merge operation. Even if it is structurally possible to perform the merge operation as in the above-described case, no merge operation is performed if it is required to keep high the accuracy of analysis of the mergeable part.

According to this method, by the operation of step S9, a grid line is added to the part having the largest inter-vertex distance, and thereafter, a grid line is added to each inter-vertex distance having the largest one of the intervals between the grid lines including the added grid line. Therefore, the target object can be divided more evenly into a mesh of elements.

Figure 10:
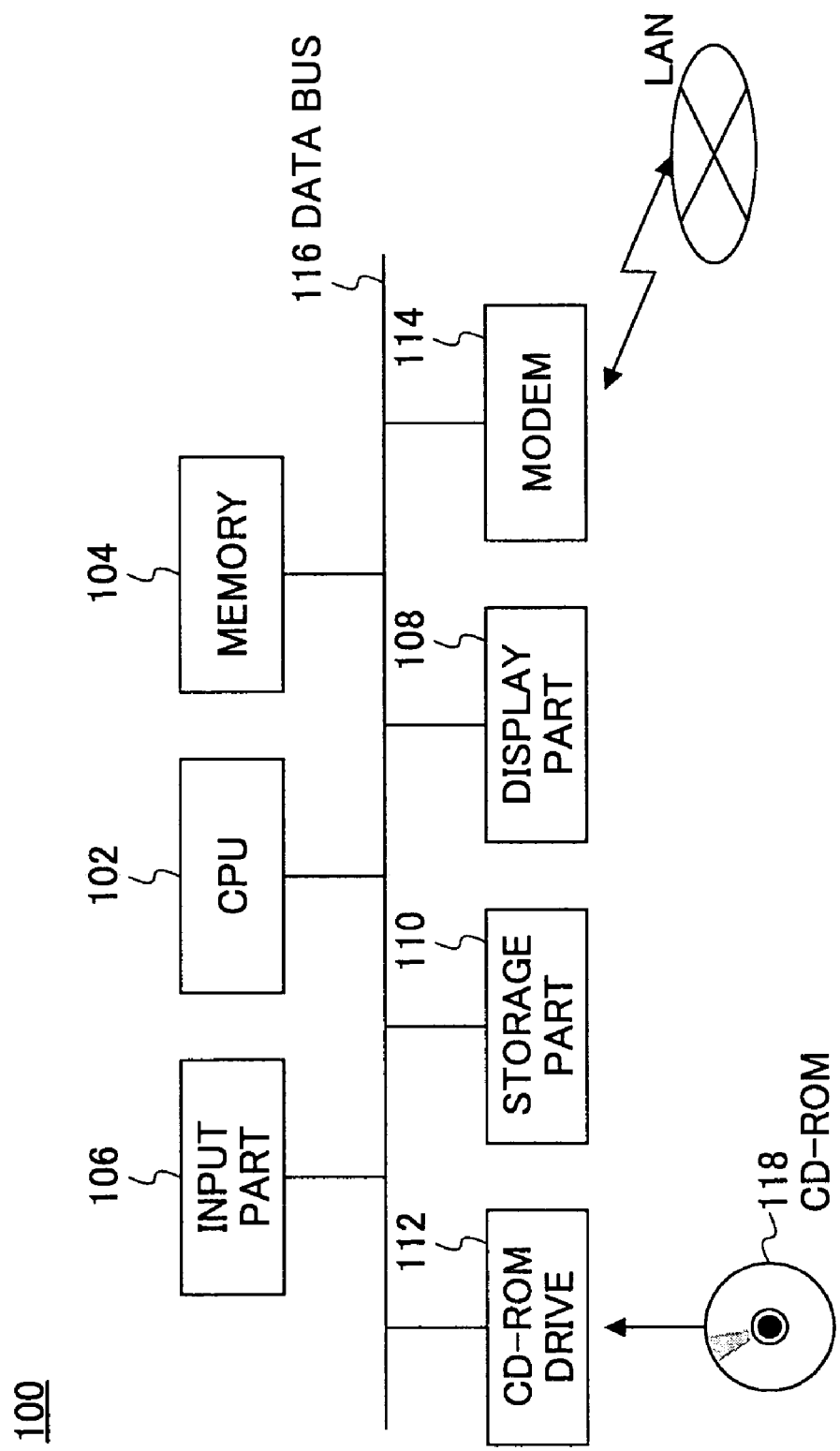
FIG. 10 is a block diagram showing a computer to which the present invention is applicable according to the embodiment of the present invention.

FIG. 10 is a block diagram showing a computer 100 to which the present invention is applicable. The computer 100 includes a CPU 102, a memory 104, an input part 106 for an operator inputting required data, a display part 108 displaying the results of the operations of the CPU 102 to the operator, a storage part 110 storing a variety of programs, a CD-ROM drive 112, and a modem 114 controlling communication with a communication network such as a LAN. The CPU 102, together with the memory 104, performs a variety of operations. The above-described components of the computer 100 are connected via a data bus 116.

A software program for causing the computer 100 to perform the method of generating mesh data described with reference to FIGS. 8 and 9A through 9C is recorded in a CD-ROM 118, for instance, and is read out therefrom by the CD-ROM drive 112 to be temporarily stored in the storage part 110. The CPU reads out the software program from the storage part 110, and executes the above-described method of generating mesh data in accordance with the software program, suitably using the memory 104. The software program may be downloaded via the LAN from another server instead of being read out from the CD-ROM 118.

The software program according to the present invention is thus executed by the computer 100, so that the computer 100 can be realized as an apparatus including a part having characteristics according to the present invention.

Practically, it is preferable that the software program be used in combination with the software program forming the thermal fluid analysis tool described with reference to FIGS. 1 through 3D. That is, the original CAD data is converted to mesh data as shown in FIGS. 9A through 9C by the software program for generating mesh data according to the embodiment, and the thus obtained mesh data is employed as data to be input to the thermal fluid analysis tool. As a result, inputting the size and the coordinate position of each of the components forming the electronic device as the object of analysis can be omitted. Adding grid lines can also be omitted. Therefore, a simulation of analysis can be performed by the operator only inputting the characteristic data such as material and the amount of heat generated by each component and setting the analysis conditions.

Thus, according to the present invention, mesh data to be input to the thermal fluid analysis tool of an electronic device can be generated with relative ease. Further, with a relatively simple configuration, the original CAD data of the electronic device can be converted to orthogonally divided mesh data formed of a minimum required number of mesh elements while maintaining the original structural information as much as possible. As a result, in the case of causing a computer to execute the method of the present invention, the amount of processing and time required in analysis operations can be effectively reduced, so that the thermal fluid analysis of the electronic device can be performed far more efficiently.

The present invention is not limited to the specifically disclosed embodiment, but variations and modifications may be made without departing from the scope of the present invention.

The present application is based on Japanese priority application No. 2002-255923 filed on Aug. 30, 2002, the entire contents of which are hereby incorporated by reference.

What is claimed is:

1. A method of generating mesh data by orthogonally dividing a target object into a mesh of elements by a plurality of grid lines orthogonally crossing each other, the method comprising the steps of:
   (a) detecting vertexes of the target object; and
   (b) dividing the target object orthogonally by the grid lines passing through the detected vertexes,
   further comprising the step of (c) adding an additional grid line to one of inter-vertex distances between the detected vertexes so that the one of the inter-vertex distances is divided into equal inter-gridline intervals.

2. The method as claimed in claim 1, wherein said step (c) adds the additional grid line to one of the inter-vertex distances which one is caused by the addition of the additional grid line to have equal inter-gridline intervals each being larger than any of equal inter-gridline intervals that each of the rest of the inter-vertex distances is caused to have by a temporary addition of the additional grid line thereto.

3. The method as claimed in claim 2, wherein said step (c) is repeated successively so that the number of added additional grid lines reaches a predetermined value.

4. The method as claimed in claim 1, further comprising the step of (d) reducing, in the generated mesh data, the number of mesh elements by combining predetermined ones of the mesh elements based on a predetermined condition.

5. The method as claimed in claim 4, wherein said step (d) comprises the step of deleting the additional grid line added in said step (c) based on the predetermined condition.

6. The method as claimed in claim 4, wherein the mesh data is generated by determining whether each of the mesh elements forms the target object based on a ratio of volume of the target object in the mesh element to volume of the mesh element.

7. The method as claimed in claim 6, wherein said step (d) is performed only when a shape formed by the mesh elements forming the target object is prevented from being substantially changed by combining the predetermined ones of the mesh elements.

8. The method as claimed in claim 1, wherein said step (c) comprises the steps of:
   (d) adding the additional grid line temporarily to each of the inter-vertex distances so that each of the inter-vertex distances is divided into equal inter-gridline intervals; and
   (e) adding the additional grid line actually to one of the inter-vertex distances which one has the largest inter-gridline interval of all of the inter-vertex distances as a result of said step (d),
   wherein said steps (d) and (e) are repeated so that the number of actually added additional grid lines reaches a predetermined value.

9. The method as claimed in claim 1, further comprising the step of (c) reducing, in the generated mesh data, a number of the elements by combining predetermined mesh elements based on a predetermined condition.

10. The method as claimed in claim 9, wherein the mesh data is generated by determining whether each of the mesh elements forms the target object based on a ratio of volume of the target object in the mesh element.

11. The method as claimed in claim 10, wherein said step (c) is performed only when a shape formed by the mesh elements forming the target object is prevented from being substantially changed by combining the predetermined ones of the mesh elements.

12. A method of generating mesh data by orthogonally dividing a target object into a mesh of elements by a plurality of grid lines orthogonally crossing each other, the method comprising the steps of:
   causing a computer to execute a program;
   (a) detecting vertexes of the target object with the program; and
   (b) dividing the target object orthogonally by the grid lines passing through the detected vertexes,
   wherein the method further comprises the step of (c) adding an additional grid line to one of inter-vertex distances between the detected vertexes so that the one of the inter-vertex distances is divided into equal inter-gridline intervals.

13. The method as claimed in claim 12, wherein said step (c) adds the additional grid line to one of the inter-vertex distances which one is caused by the addition of the additional grid line to have equal inter-gridline intervals each being larger than any of equal inter-gridline intervals that each of the rest of the inter-vertex distances is caused to have by a temporary addition of the additional grid line thereto.

14. The method as claimed in claim 13, wherein said step (c) is repeated successively so that the number of added additional grid lines reaches a predetermined value.

15. The method as claimed in claim 12, wherein the method further comprises the step of (d) reducing, in the generated mesh data, the number of mesh elements by combining predetermined ones of the mesh elements based on a predetermined condition.

16. The method as claimed in claim 15, wherein said step (d) comprises the step of deleting the additional grid line added in said step (c) based on the predetermined condition.

17. The method as claimed in claim 16, wherein the mesh data is generated by determining whether each of the mesh elements forms the target object based on a ratio of volume of the target object in the mesh element to volume of the mesh element.

18. The method as claimed in claim 17, wherein said step (d) is performed only when a shape formed by the mesh elements forming the target object is prevented from being substantially changed by combining the predetermined ones of the mesh elements.

19. The method as claimed in claim 12, wherein said step (c) comprises the steps of:
   (d) adding the additional grid line temporarily to each of the inter-vertex distances so that each of the inter-vertex distances is divided into equal inter-gridline intervals; and
   (e) adding the additional grid line actually to one of the inter-vertex distances which one has the largest inter-gridline interval of all of the inter-vertex distances as a result of said step (d),
   wherein said steps (d) and (e) are repeated so that the number of actually added additional grid lines reaches a predetermined value.

20. The method as claimed in claim 12, wherein the method further comprises the step of (c) reducing, in the generated mesh data, a number of the elements by combining predetermined mesh elements based on a predetermined condition.

21. The method as claimed in claim 20, wherein the mesh data is generated by determining whether each of the mesh elements forms the target object based on a ratio of volume of the target object in the mesh element.

22. The method as claimed in claim 21, wherein said step (c) is performed only when a shape formed by the mesh elements forming the target object is prevented from being substantially changed by combining the predetermined ones of the mesh elements.

23. A computer-readable recording medium storing a program for causing a computer to execute a method of generating mesh data by orthogonally dividing a target object into a mesh of elements by a plurality of grid lines orthogonally crossing each other, the method comprising the steps of:
(a) detecting vertexes of the target object; and
(b) dividing the target object orthogonally by the grid lines passing through the detected vertexes,
wherein the method further comprises the step of (c) adding an additional grid line to one of inter-vertex distances between the detected vertexes so that the one of the inter-vertex distances is divided into equal inter-gridline intervals.

24. The computer-readable recording medium as claimed in claim 23, wherein said step (c) adds the additional grid line to one of the inter-vertex distances which one is caused by the addition of the additional grid line to have equal inter-gridline intervals each being larger than any of equal inter-gridline intervals that each of the rest of the inter-vertex distances is caused to have by a temporary addition of the additional grid line thereto.

25. The computer-readable recording medium as claimed in claim 24, wherein said step (c) is repeated successively so that the number of added additional grid lines reaches a predetermined value.

26. The computer-readable recording medium as claimed in claim 23, wherein the method further comprises the step of (d) reducing, in the generated mesh data, the number of mesh elements by combining predetermined ones of the mesh elements based on a predetermined condition.

27. The computer-readable recording medium as claimed in claim 26, wherein said step (d) comprises the step of deleting the additional grid line added in said step (c) based on the predetermined condition.

28. The computer-readable recording medium as claimed in claim 27, wherein the mesh data is generated by determining whether each of the mesh elements forms the target object based on a ratio of volume of the target object in the mesh element to volume of the mesh element.

29. The computer-readable recording medium as claimed in claim 28, wherein said step (d) is performed only when a shape formed by the mesh elements forming the target object is prevented from being substantially changed by combining the predetermined ones of the mesh elements.

30. The computer-readable recording medium as claimed in claim 23, wherein said step (c) comprises the steps of:
(d) adding the additional grid line temporarily to each of the inter-vertex distances so that each of the inter-vertex distances is divided into equal inter-gridline intervals; and
(e) adding the additional grid line actually to one of the inter-vertex distances which one has the largest inter-gridline interval of all of the inter-vertex distances as a result of said step (d),
wherein said steps (d) and (e) are repeated so that the number of actually added additional grid lines reaches a predetermined value.

31. The computer-readable recording medium as claimed in claim 23, wherein the method further comprises the step of (c) reducing, in the generated mesh data, a number of the elements by combining predetermined mesh elements based on a predetermined condition.

32. The computer-readable recording medium as claimed in claim 31, wherein the mesh data is generated by determining whether each of the mesh elements forms the target object based on a ratio of volume of the target object in the mesh element.

33. The computer-readable recording medium as claimed in claim 32, wherein said step (c) is performed only when a shape formed by the mesh elements forming the target object is prevented from being substantially changed by combining the predetermined ones of the mesh elements.

34. An apparatus for generating mesh data by orthogonally dividing a target object into a mesh of elements by a plurality of grid lines orthogonally crossing each other, the apparatus comprising:
a detection part detecting vertexes of the target object; and
a division part dividing the target object orthogonally by the grid lines passing through the detected vertexes,
further comprising an addition part adding an additional grid line to one of inter-vertex distances between the detected vertexes so that the one of the inter-vertex distances is divided into equal inter-gridline intervals.

35. The apparatus as claimed in claim 34, wherein said addition part adds the additional grid line to one of the inter-vertex distances which one is caused by the addition of the additional grid line to have equal inter-gridline intervals each being larger than any of equal inter-gridline intervals that each of the rest of the inter-vertex distances is caused to have by a temporary addition of the additional grid line thereto.

36. The apparatus as claimed in claim 35, wherein said addition part repeats the addition of the additional grid line successively so that the number of added additional grid lines reaches a predetermined value.

37. The apparatus as claimed in claim 34, further comprising a combination part reducing, in the generated mesh data, the number of mesh elements by combining predetermined ones of the mesh elements based on a predetermined condition.

38. The apparatus as claimed in claim 37, wherein said combination part deletes the additional grid line added by said addition part based on the predetermined condition.

39. The apparatus as claimed in claim 38, wherein the mesh data is generated by determining whether each of the mesh elements forms the target object based on a ratio of volume of the target object in the mesh element to volume of the mesh element.

40. The apparatus as claimed in claim 39, wherein said combination part combines the predetermined ones of the mesh elements only when a shape formed by the mesh elements forming the target object is prevented from being substantially changed by combining the predetermined ones of the mesh elements.

41. The apparatus as claimed in claim 34, wherein said addition part adds the additional grid line temporarily to each of the inter-vertex distances so that each of the inter-vertex distances is divided into equal inter-gridline intervals, and adds the additional grid line actually to one of the inter-vertex distances which one has the largest inter-gridline interval of all of the inter-vertex distances as a result of the temporary addition of the additional grid line, said addition part repeats the temporary addition and the actual addition of the additional grid line so that the number of actually added additional grid lines reaches a predetermined value.

42. The apparatus as claimed in claim 34, further comprising a combination part reducing, in the generated mesh data, a number of the elements by combining predetermined mesh elements based on a predetermined condition.

43. The apparatus as claimed in claim 42, wherein the mesh data is generated by determining whether each of the mesh elements forms the target object based on a ratio of volume of the target object in the mesh element.

44. The apparatus as claimed in claim 43, wherein said combination part combines the predetermined ones of the mesh elements only when a shape formed by the mesh elements forming the target object is prevented from being substantially changed by combining the predetermined ones of the mesh elements.

* * * * *